United States Patent
Juarez et al.

(10) Patent No.: US 8,888,384 B2
(45) Date of Patent: Nov. 18, 2014

(54) APPARATUS AND METHOD FOR INCREASING THE EFFECTIVE CAPTURE AREA IN OPTICAL TERMINALS

(75) Inventors: Juan C. Juarez, Windsor Mill, MD (US); David W. Young, Clarksville, MD (US); Joseph E. Sluz, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 789 days.

(21) Appl. No.: 13/051,092

(22) Filed: Mar. 18, 2011

(65) Prior Publication Data

US 2011/0229081 A1    Sep. 22, 2011

Related U.S. Application Data

(60) Provisional application No. 61/315,133, filed on Mar. 18, 2010.

(51) Int. Cl.
  *G02B 6/255*   (2006.01)
  *G02B 6/26*    (2006.01)
  *G02B 6/02*    (2006.01)
  *G02B 6/32*    (2006.01)

(52) U.S. Cl.
  CPC ............ *G02B 6/262* (2013.01); *G02B 6/02042* (2013.01); *G02B 6/32* (2013.01)
  USPC .......................................................... 385/96

(58) Field of Classification Search
  None
  See application file for complete search history.

(56) References Cited

U.S. PATENT DOCUMENTS

| | | | |
|---|---|---|---|
| 6,585,432 B1 | 7/2003 | Palese | |
| 6,658,190 B2 | 12/2003 | Hirano et al. | |
| 6,934,477 B2 | 8/2005 | Willebrand | |
| 6,944,403 B2 | 9/2005 | Margalit et al. | |
| 7,076,139 B1 | 7/2006 | Aikawa et al. | |
| 2002/0131699 A1* | 9/2002 | Raguin et al. | 385/33 |
| 2002/0171896 A1 | 11/2002 | Clark et al. | |
| 2004/0213515 A1* | 10/2004 | Pezeshki et al. | 385/31 |
| 2004/0223697 A1* | 11/2004 | Andersen et al. | 385/39 |
| 2009/0202254 A1 | 8/2009 | Majumdar et al. | |
| 2010/0098426 A1 | 4/2010 | Cornish et al. | |

FOREIGN PATENT DOCUMENTS

| | | |
|---|---|---|
| EP | 0 789 255 | 5/2002 |
| WO | WO 00/54413 | 9/2000 |

OTHER PUBLICATIONS

David B. Mortimore and John W. Arkwright, Monolithic Wavelength-Flattened 1×7 Single-Mode Fused Fiber Couplers: Theory, Fabrication, and Analysis, Applied Optics, Feb. 20, 1991, vol. 30, No. 6.

C. S. Hsieh, T. L. Wu, W. H. Cheng, An Optimum Approach for Fabrication of Low Loss Fused Fiber Couplers, Elsevier—Materials Chemistry and Physics, 2001 Elsevier Science B.V., 199-203.

* cited by examiner

*Primary Examiner* — Tina Wong
(74) *Attorney, Agent, or Firm* — Noah J. Hayward

(57) ABSTRACT

At least two single-mode optical fibers are fused together such that their cores are separated by only a few microns to serve as a capture element of an incoming beam of light in an optical terminal.

10 Claims, 6 Drawing Sheets

APPARATUS AND METHOD FOR INCREASING THE EFFECTIVE CAPTURE AREA IN OPTICAL TERMINALS

CROSS-REFERENCE TO RELATED APPLICATIONS

This application relates to U.S. provisional application No. 61/315,133, filed on Mar. 18, 2010, which is incorporated herein by reference in its entirety.

BACKGROUND OF THE INVENTION

The present invention relates to free-space optical communication terminals and, more specifically, to an apparatus and method for increasing capture area in optical terminals.

High-bandwidth, free-space optical (FSO) communication terminals generally fall into two categories: single- or multi-mode fiber coupled. This refers to the type of fiber used to couple the received optical signal from free space into an optical fiber for interfacing to high-bandwidth, back-end systems.

Single-mode terminals are generally more complex as they have to place the incoming signal on a much smaller target on the order of 8-10 µm as opposed to multi-mode terminals where the target can be 50 or 63 µm. The tradeoff is that the back-end system, the transceivers and optical auto gain controllers (OAGCs), have much better performance for single-mode vs. multi-mode systems.

Most importantly, for a communication system, single-mode systems can leverage lower noise optical amplifiers to achieve lower receiver sensitivities. This yields much more link margin as compared to multi-mode receivers. For example, a 10 Gbps single-mode system operating at a wavelength of 1550 nm can achieve a receiver sensitivity of −40 dBm as compared to −26 dBm for a multi-mode system. This additional link margin is highly desired to achieve high-throughput FSO communication links.

The cost of using a single-mode system is complexity in the optical terminal. Generally, single-mode terminals require a high-performance adaptive optics system to correct wavefront distortions of the optical signal in order to focus it on the receive fiber.

What is needed then is an increase in the area or acceptance angle of the receive fiber in order to lessen the pointing requirements of the terminal and thereby reap the other benefits of a single-mode system.

SUMMARY OF THE INVENTION

Therefore, the present invention has been made in view of the above problems and constraints, and provides an apparatus and method to achieve the above objectives.

The inventive apparatus and method increases the effective capture area in an optical terminal for incoming free-space signals and couples the signals to the small cores of single-mode fibers while maintaining the acceptance angle of each fiber. The invention thus allows for simpler beam control methods such as tip/tilt (as opposed to more complex approaches such as adaptive optics systems) and the associated feedback loop to be utilized to maintain the incoming signal on the capture element in the optical terminal. As a result, the invention leverages the performance of single-mode back end transceivers and OAGCs with the lower complexity of multi-mode terminals.

The present invention is therefore directed to a method for increasing the effective capture area in an optical terminal comprising fusing at least two optical fibers while maintaining the acceptance angle of each to bring the cores of the fibers closer together than can be achieved without fusing; and inserting the fused fibers into the optical terminal for use as a capture element of an incoming light beam.

The present invention is further directed to a capture element of an optical terminal for capturing an incoming beam of light comprising at least two optical fibers, the at least two fibers being fused together thereby having a core of each fiber being closer together than can be achieved without fusing.

The present invention is further directed to a method for providing feedback in an optical terminal comprising fusing at least two optical fibers to bring the cores of the optical fibers closer together than can be achieved without fusing; inserting the at least two fused optical fibers into the optical terminal for use as a capture element of an incoming light beam; monitoring the power at the output of each of the at least two fused optical fibers to determine the position of the incoming light beam; and driving a feedback loop using the output power to keep the incoming light beam centered on the at least two fused optical fibers.

The present invention is further directed to an optical terminal comprising a capture element comprising at least two optical fibers, the at least two fibers being fused together thereby having a core of each fiber being closer together than can be achieved without fusing; and a means for maintaining an incoming light beam centered on the capture element comprising a means for monitoring the position of the incoming beam of light; and a means for moving the incoming light beam.

Those and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Reference will now be made in detail to the exemplary embodiments of the present invention, examples of which are illustrated in the accompanying drawings.

Figure 1:
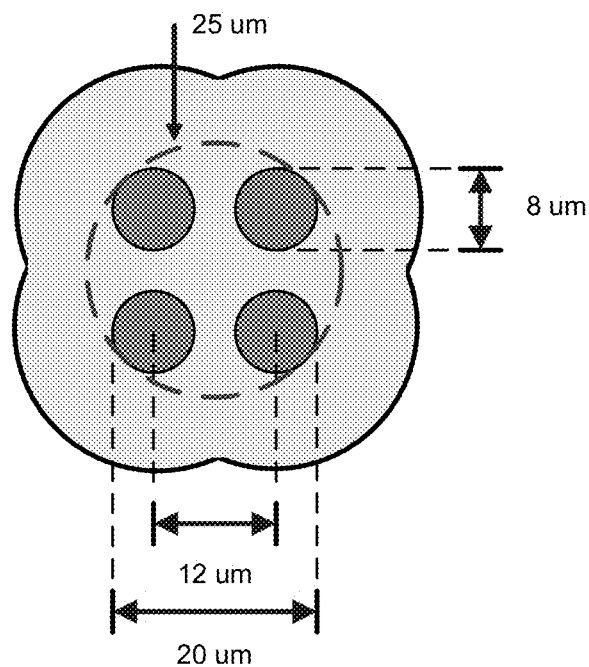
FIG. 1 is a schematic illustrating the cross-section of four single-mode fibers fused together.
Figure 2:
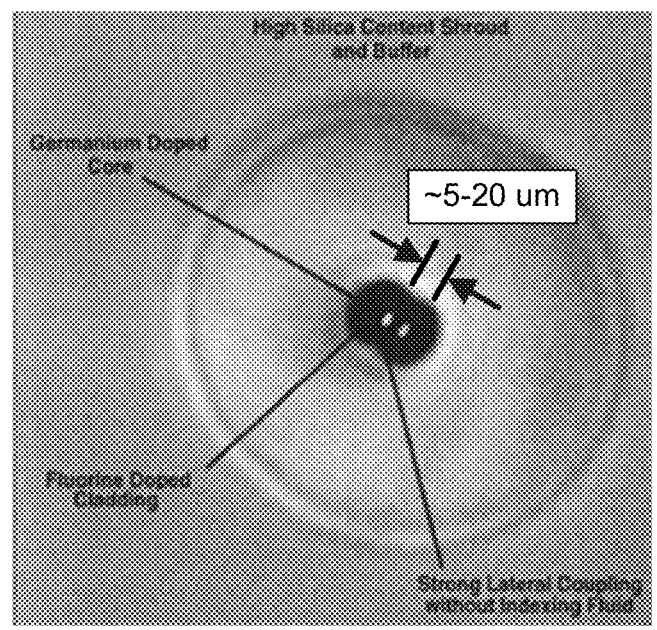
FIG. 2 illustrates an example found on the internet of a cross-section of two fused optical fibers wherein the cores are separated approximately 5-20

In the invention, a bundle of fused single-mode fibers serves as the capture element of the incoming beam in an optical terminal. The invention, in one embodiment, consists of at least two optical fibers fused together resulting in their cores being adjacent to each other, separated by only a few microns. A schematic of a four optical fiber embodiment of the invention is shown in FIG. 1 where four single-mode fibers 10 have been fused together in a 25 µm diameter area in which the cores are 12 µm apart. An example found on the internet of two actual fused optical fibers with the two cores separated approximately 5-20 µm is shown in FIG. 2. By fusing fibers together in a fashion similar to what is done with fused fiber couplers (used for splitting or combining signals), the core of the fibers, which capture the bulk of the optical energy, are brought much closer together, on the order of approximately 5-25 µm, than what could be achieved without fusing, thus, increasing the effective capture area over one single-mode fiber while maintaining the acceptance angle of each fiber.

Methods for fusing fiber couplers are disclosed, for example, in C. S. Hsieh, T. L. Wu, and W. H. Cheng, "An optimum approach for fabrication of low loss fused fiber couplers," Materials Chemistry and Physics 69 (2001) 199-203 and in D. B. Mortimore and J. W. Arkwright, "Monolithic wavelength-flattened 1.times.7 single-mode fused fiber couplers: theory, fabrication, and analysis," Applied Optics, 30 (1991) 650-659, the contents of both articles being incorporated herein by reference in their entireties.

The advantages of the invention are evident in a static case where an optical terminal has a telescope that can focus the incoming signal down to a 25 µm diameter disk. Under a multi-mode fiber approach, the entire signal can be easily captured with a conventional 50 µm fiber. For the 10 Gbps case referenced above though, this limits the receiver sensitivity to −26 dBm. If a single-mode approach is used, the 8 µm diameter capture area of the fiber would introduce a 10 dB loss on the incoming signal. This almost offsets the 14 dB link margin gained in receiver sensitivity as mentioned above.

On the other hand, a fused fiber bundle with four single-mode fibers as illustrated in FIG. 1, quadruples the capture area over the one single-mode fiber and reduces the loss hit to 4 dB as compared to the multimode fiber. Also, the requirements on the terminal's tracking/focusing system are reduced by over a factor of three as compared to the single-mode terminal as discussed below. Therefore, using the invention leverages the best of both worlds—the sensitivity of single-mode systems can be approached with the reduced complexity of multimode terminals.

Figure 3A:
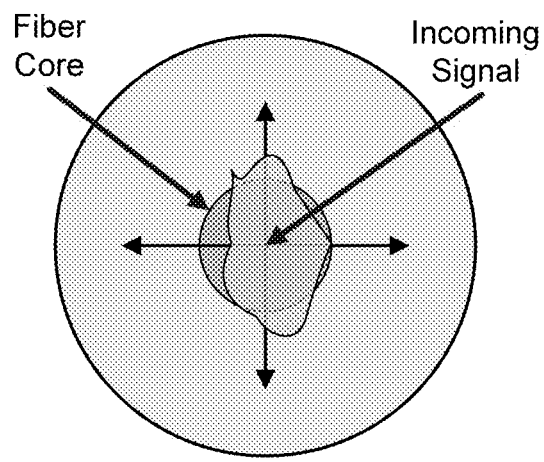
FIG. 3, consisting of FIGS. 3A, 3B and 3C, illustrate, respectively, a cross-section of receive fiber and incoming beam; a side view of a receiver telescope and incoming beam; and a cross-section of receive fiber and incoming beam missing the receive fiber.
Figure 3B:
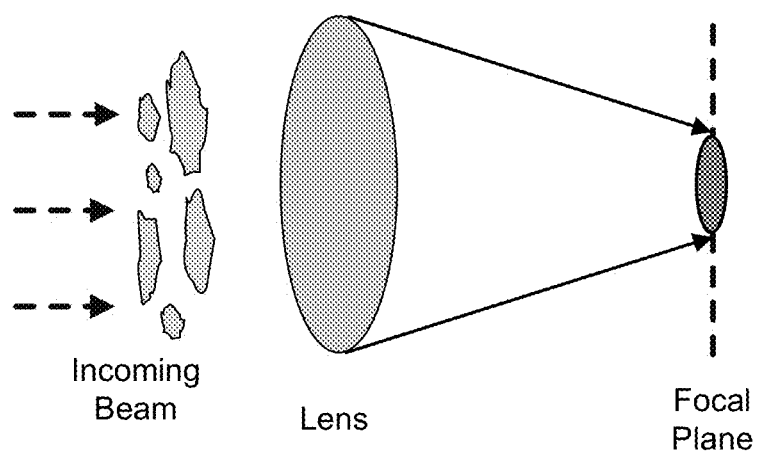
Figure 3C:
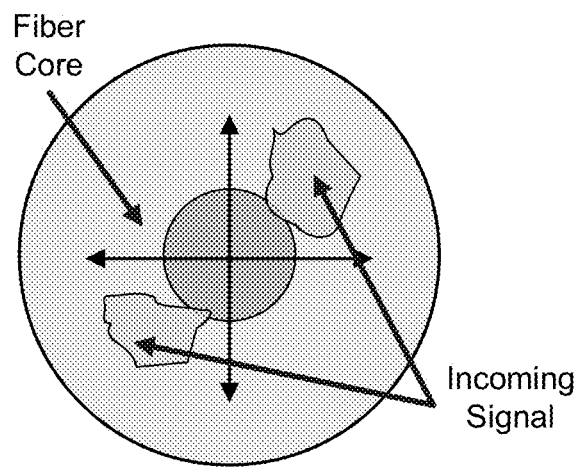
Figure 4:
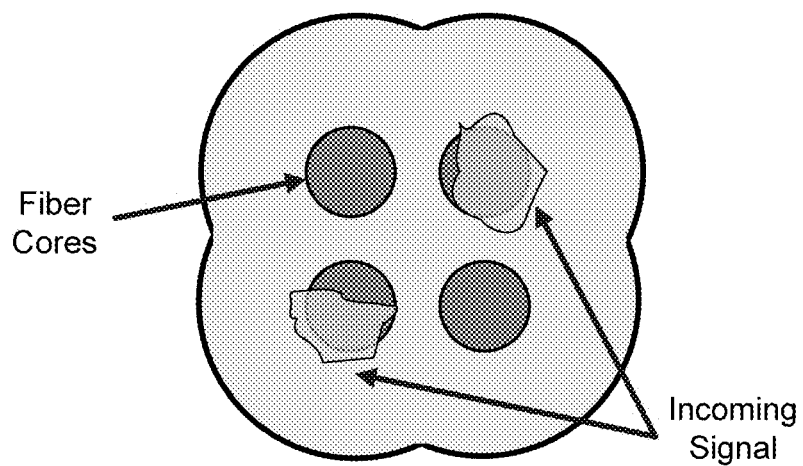
FIG. 4, is a schematic illustrating the cross-section of a fused fiber bundle with incoming beam.
Figure 5:
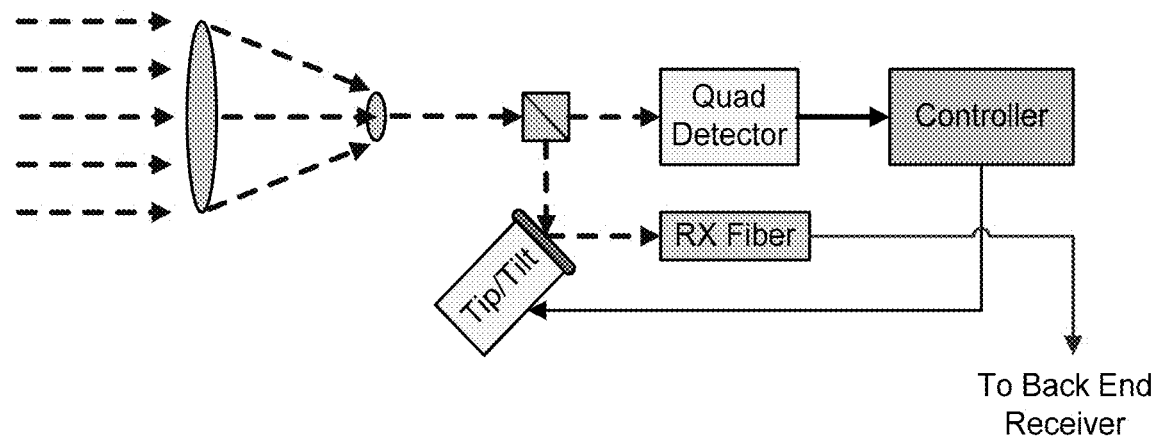
FIG. 5, illustrates a functional block diagram of tip/tilt control of conventional free-space optical terminals.

Basic tip/tilt correction terminals used in multimode terminals are designed to keep the incoming signal energy centered on the capture fiber as illustrated in FIG. 3A; see also FIG. 5. One of the major challenges to successfully keeping the signal energy centered is scintillation of the optical beam during strong turbulence. If the incoming beam is broken up into many hot/dark spots, as illustrated in FIG. 3B, this can result in the total signal energy being centered on the capture fiber but most of the signal energy failing to couple into the receive fiber (FIG. 3C). Situations such as these can lead to very deep power fades that result in large bursts of errors on the communication channel. The invention, by providing a larger effective area, results in fewer power fades in a fashion similar to multimode systems as shown in FIG. 4. This provides an advantage to the communication systems by vastly improving its bit error rate performance.

Another feature of the invention is that it provides an integrated method of capturing the receive signal and providing feedback on the position of the beam to the tracking system. This is an advantage as compared to conventional systems (see FIG. 5) that have to tap off a portion of the incoming beam and direct it to a sensing element (such as a camera or quad detector) in order to obtain information about the position (or misalignment) of the incoming beam. This information is used to drive a feedback loop to adjust a tracking element (e.g., tip/tilt mirror) to maintain the incoming beam centered on the receive fiber.

Figure 6:
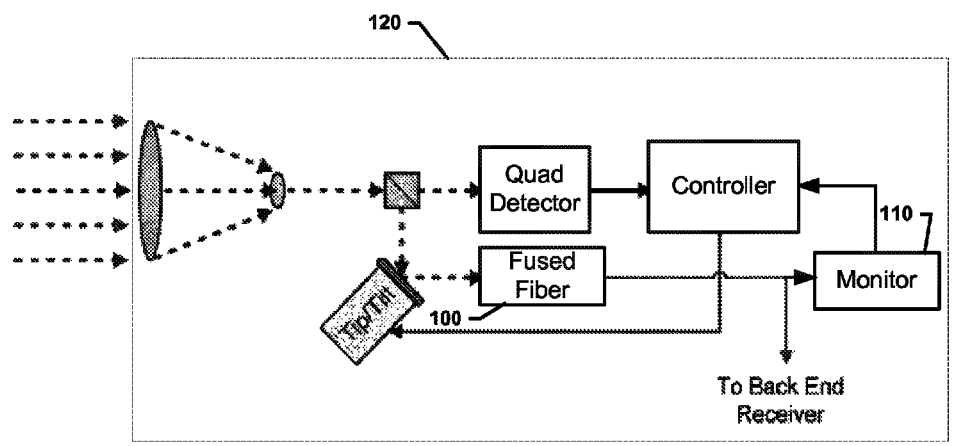
FIG. 6 illustrates a functional block diagram of tip/tilt control of free-space optical terminals in accordance with an example embodiment.

FIG. 6 illustrates an example embodiment in which a fused fiber bundle (or capture element) 100 is provided. In the fused fiber bundle of the invention, the power at each output fiber can be monitored (e.g., via monitor 110) to determine the position of the incoming beam and that information used to drive the feedback loop so that the beam can be kept centered on the bundle. This approach reduces the insertion loss from the power tap and reduces the size and weight of the terminal.

The invention provides an optical terminal 120 that approaches the sensitivity of single-mode systems with the reduced complexity of multimode terminals in the tracking/focusing and associated feedback loop systems.

Figure 7:
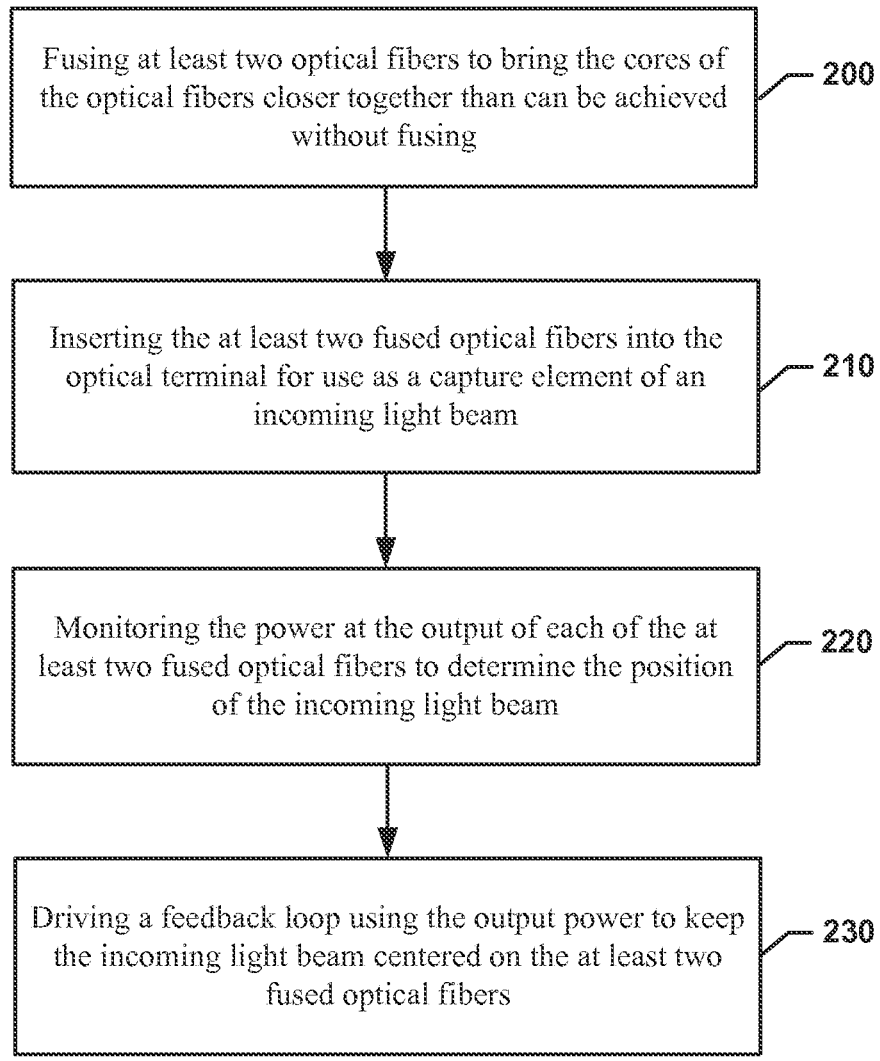
FIG. 7 illustrates a block diagram of a method in accordance with an example embodiment.

FIG. 7 illustrates a block diagram of a method for providing feedback in an optical terminal. The method comprises fusing at least two optical fibers to bring the cores of the optical fibers closer together than can be achieved without fusing at operation 200, inserting the at least two fused optical fibers into the optical terminal for use as a capture element of an incoming light beam at operation 210, monitoring the power at the output of each of the at least two fused optical fibers to determine the position of the incoming light beam at operation 220, and driving a feedback loop using the output power to keep the incoming light beam centered on the at least two fused optical fibers at operation 230.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for providing feedback in an optical terminal comprising:

fusing at least two optical fibers to bring the cores of the optical fibers closer together than can be achieved without fusing;

inserting the at least two fused optical fibers into the optical terminal for use as a capture element of an incoming light beam;

monitoring the power at the output of each of the at least two fused optical fibers to determine the position of the incoming light beam; and driving a feedback loop using the output power to keep the incoming light beam centered on the at least two fused optical fibers.

2. The method as recited in claim 1, wherein the at least two optical fibers comprise single-mode fibers.

3. The method as recited in claim 2, wherein the cores of the at least two fused optical fibers are separated by between approximately 5 and 25 microns.

4. The method as recited in claim 1, wherein the method is devoid of splitting a portion of the incoming light beam to provide a tapped off portion of the incoming light beam, directing the tapped off portion of the incoming light beam to a sensing element that obtains information about the positioning of the incoming light beam, and driving the feedback loop from the information obtained from the tapped off portion.

5. The method of claim 4, wherein the fusing at least two optical fibers comprises fusing at least four optical fibers to bring the cores of the optical fibers closer together than can be achieved without fusing.

6. An optical terminal comprising:
   a capture element comprising at least two optical fibers, the at least two fibers being fused together thereby having a core of each fiber being closer together than can be achieved without fusing;
   a tip/tilt element configured to maintain an incoming light beam centered on the capture element; and
   a monitor element configured to monitor the position of the incoming light beam by monitoring the power at the output of the at least two fused optical fibers to determine the position of the incoming light beam;
   wherein the tip/tilt element is configured to move the incoming light beam based on control via a feedback loop using the output power to drive the tip/tilt element to keep the incoming light beam centered on the at least two fused optical fibers.

7. The optical terminal as recited in claim 6, wherein the at least two optical fibers comprise single-mode fibers.

8. The optical terminal as recited in claim 7, wherein the cores of the at least two fused optical fibers are separated by between approximately 5 and 25 microns.

9. The optical terminal as recited in claim 6, wherein the tip/tilt element is devoid of a splitting element configured to split a portion of the incoming light beam to provide a tapped off portion of the incoming light beam and a feedback loop driven by information obtained from the tapped off portion.

10. The optical terminal as recited in claim 6, wherein the capture element comprises at least four optical fibers, the at least four fibers being fused together thereby having a core of each fiber being closer together than can be achieved without fusing.

* * * * *